(12) United States Patent
Park et al.

(10) Patent No.: US 9,675,904 B2
(45) Date of Patent: Jun. 13, 2017

(54) REBOILING DEVICE AND REGENERATION TOWER

(71) Applicants: Hyundai Motor Company, Seoul (KR); Kia Motors Corporation, Seoul (KR); Korea Institute of Energy Research, Daejeon (KR)

(72) Inventors: Sungyeoul Park, Daejeon (KR); Yeoil Yoon, Daejeon (KR); Sungchan Nam, Daejeon (KR); Shin-Tae Bae, Gyeonggi-Do (KR)

(73) Assignees: Hyundai Motor Company, Seoul (KR); Kia Motors Corporation, Seoul (KR); Korea Institute of Energy Research, Daejeon (KR)

( * ) Notice: Subject to any disclaimer, the term of this patent is extended or adjusted under 35 U.S.C. 154(b) by 287 days.

(21) Appl. No.: 14/329,221

(22) Filed: Jul. 11, 2014

(65) Prior Publication Data

US 2015/0196857 A1    Jul. 16, 2015

(30) Foreign Application Priority Data

Jan. 14, 2014 (KR) ........................ 10-2014-0004321

(51) Int. Cl.
| | | |
|---|---|---|
| *B01D 53/14* | (2006.01) | |
| *B01D 19/00* | (2006.01) | |
| *B01D 53/92* | (2006.01) | |

(52) U.S. Cl.
CPC ..... *B01D 19/0073* (2013.01); *B01D 53/1425* (2013.01); *B01D 53/92* (2013.01);
(Continued)

(58) Field of Classification Search
CPC .................................................. B01D 53/1425
See application file for complete search history.

(56) References Cited

U.S. PATENT DOCUMENTS 5,697,229 A    12/1997   Agrawal et al.
7,981,256 B2   7/2011    Wegerer et al.
(Continued)

FOREIGN PATENT DOCUMENTS

| JP | 2002-191934 A | 7/2002 |
|---|---|---|
| JP | 2012-087032 A | 5/2012 |
| KR | 10-2013-0010253 A | 1/2013 |

*Primary Examiner* — Robert A Hopkins
(74) *Attorney, Agent, or Firm* — Mintz Levin Cohn Ferris Glovsky and Popeo, P.C.; Peter F. Corless

(57) ABSTRACT

A regeneration tower may include: a rich absorbent liquid supplier that supplies rich absorbent liquid into a first housing; a rectifier positioned below the rich absorbent liquid supplier and rectifying flow of the rich absorbent liquid supplied downwardly in the first housing; a reboiler positioned below the rectifier and separating regeneration gas from the rich absorbent liquid by boiling the rich absorbent liquid; a separator that supplies the rich absorbent liquid from the rectifier to the rich absorbent liquid tank, bypassing the regeneration gas generated in the reboiler into the first housing through a path different from a supply path of the rich absorbent liquid to the reboiler; and a lean absorbent liquid tank receiving lean absorbent liquid from which the regeneration gas is separated in the reboiler, where the reboiler receives the rich absorbent liquid only through the rich absorbent liquid tank.

7 Claims, 3 Drawing Sheets

(52) U.S. Cl.
CPC .... *B01D 53/1475* (2013.01); *B01D 2259/455* (2013.01); *Y02C 10/06* (2013.01)

(56) References Cited

U.S. PATENT DOCUMENTS

2008/0314079 A1    12/2008  Brostow
2014/0338394 A1*   11/2014  Oohashi ............ B01D 53/1475
                                                      62/617

* cited by examiner

REBOILING DEVICE AND REGENERATION TOWER

CROSS-REFERENCE TO RELATED APPLICATION

This application claims under 35 U.S.C. §119(a) priority to and the benefit of Korean Patent Application No. 10-2014-0004321 filed in the Korean Intellectual Property Office on Jan. 14, 2014, the entire contents of which are incorporated herein by reference.

BACKGROUND (a) Field of the Invention

The present invention relates to an apparatus that is commonly applicable to a gas-liquid separating process using a reboiling device. More particularly, the present invention relates to the reboiling device and a regeneration tower provided with the same that are used in a regeneration process of a boiling type in order to regenerate and reuse saturated absorbent liquid containing gas that is a removing object.

(b) Description of the Related Art

Recently, a technique for suppressing release of carbon dioxide into the atmosphere has been developed in order to counteract the effects of global warming and air pollution. Particularly, methods of efficiently trapping carbon dioxide emitted from thermoelectric power plants or boiler equipment have been developed.

Among various methods of trapping gas, it is widely known that a chemical absorption method using absorbent liquid is most suitable to trapping carbon dioxide of large capacity. According to the chemical absorption method, carbon dioxide emitted from thermoelectric power plants or boiler equipment is absorbed in absorbent liquid in an absorption tower, and saturated absorbent liquid containing carbon dioxide is heated in a regeneration tower so as to separate the carbon dioxide from the absorbent liquid.

A reboiler for heating the absorbent liquid is mounted at the regeneration tower as an energy source for regeneration. The reboiler heats the absorbent liquid up to a temperature at which the regeneration is possible so as to separate the gas contained in the absorbent liquid. The gas separated from the absorbent liquid moves to an upper portion of the regeneration tower such that useful material is collected into a condenser and the gas that is removing object is discharged from the regeneration tower.

Conventionally, a reboiler of kettle type or a reboiler of thermocyphon type is used.

The reboiler of kettle type includes first and second parts therein divided by a wall. A heater or a heat-exchanger is disposed in the first part, and an absorbent liquid outlet is formed at the second part. If the absorbent liquid containing the gas is supplied to an upper portion of the reboiler, a level of the absorbent liquid in the reboiler rises. At this time, the absorbent liquid is heated by the heater or the heat-exchanger, and the gas is separated from the absorbent liquid and moves upwardly. As the absorbent liquid is supplied continuously, the absorbent liquid from which the gas is removed or which contains less gas crosses the wall and moves to the second part. After that, the absorbent liquid is discharged from the reboiler through the absorbent liquid outlet. According to the reboiler of kettle type, slosh occurs due to liquid wave generated by liquid drop and boiling of mixed liquid. Therefore, it is very difficult to control a level of the absorbent liquid precisely.

The reboiler of thermocyphon type includes a heater or a heat-exchanger therein, and an absorbent liquid outlet is formed at a bottom surface of the reboiler. If the absorbent liquid containing the gas is supplied to an upper portion of the reboiler, the absorbent liquid in the reboiler is heated by the heater or the heat-exchanger, and the gas is separated from the absorbent liquid and moves upwardly. At this time, the absorbent liquid from which the gas is removed or which contains less gas moves toward the bottom surface of the reboiler and is discharged from the reboiler through the absorbent liquid outlet. According to the reboiler of thermocyphon type, it is difficult to control a level of the absorbent liquid due to boiling. In addition, since there is no wall in the boiler, the mixed liquid remains in the reboiler for a very short time. Therefore, less energy is supplied to the mixed liquid, and gas separation efficiency for regeneration is very low.

In addition, a supply path of the mixed liquid and a discharge path of the gas separated from the mixed liquid are the same in the reboiler of kettle type and the reboiler of thermocyphon type. Therefore, if bubbles occur due to heating, the mixed liquid cannot reach the heater or the heat-exchanger by the bubbles. If this condition continues, the level of the mixed liquid in the regeneration tower is raised too high such that the absorption tower and the regeneration tower cannot work properly.

The above information disclosed in this Background section is only for enhancement of understanding of the background of the invention and therefore it may contain information that does not form the prior art that is already known in this country to a person of ordinary skill in the art.

SUMMARY

The present invention is directed to a reboiling device and a regeneration tower provided with the same having advantages of separating gas from absorbent liquid stably by separating path of mixed liquid supplied to a reboiler from a path of the gas discharged from the reboiler.

A reboiling device according to an exemplary embodiment of the present invention may include: a reboiler configured to separate regeneration gas from rich absorbent liquid by boiling the rich absorbent liquid; a rich absorbent liquid tank configured to supply the rich absorbent liquid to the reboiler; a lean absorbent liquid tank configured to discharge lean absorbent liquid from which the regeneration gas is separated in the reboiler; and a separator configured to discharge the regeneration gas generated in the reboiler and to separate a supply path of the rich absorbent liquid to the reboiler from a discharge path of the regeneration gas from the reboiler.

The rich absorbent liquid may not be directly supplied but be supplied through the rich absorbent liquid tank to the reboiler.

The reboiler and the separator may be provided in a first housing, the rich absorbent liquid tank may be formed in a second housing, and the lean absorbent liquid tank may be formed in a third housing.

The separator may be disposed above the reboiler.

The first housing and the second housing may be in fluid communication with each other through a rich absorbent liquid connection line above the reboiler, and the first housing and the third housing may be in fluid communication with each other through a lean absorbent liquid connection line between the reboiler and the separator.

The rich absorbent liquid may be supplied from an upper portion of the reboiling device in the first housing to the rich absorbent liquid tank through the rich absorbent liquid connection line, and a lower portion of the rich absorbent liquid tank and a lower portion of the reboiler may be in fluid communication with eha other such that the rich absorbent liquid in the rich absorbent liquid tank is supplied to the lower portion of the reboiler.

The separator may include: a mounting plate disposed traversely across the first housing so as to divide the first housing into two regions, disposed above the reboiler, and provided with at least one through-hole formed at a middle portion thereof and in fluid communication with the two regions; a body of hollow pillar shape mounted on an upper surface of the mounting plate and having a lower surface in fluid communication through the at least one through-hole with one region of the first housing in which the reboiler is disposed, and an upper surface blocked by a roof; and at least one regeneration gas bypass port formed at a side surface of the body and fluidly communicating an interior of the body with an exterior of the body, wherein the at least one through-hole is formed at a side surface of the body.

The first housing and the second housing may be in fluid communication with each other through the rich absorbent liquid connection line, the first housing and the third housing may be in fluid communication with each other through the lean absorbent liquid connection line, a connecting port on of the rich absorbent liquid connection line and the first housing may be positioned above the mounting plate, and a connecting portion of the lean absorbent liquid connection line and the first housing may be positioned below the mounting plate.

A connecting portion of the lean absorbent liquid connection line and the first housing may be positioned above the reboiler.

The reboiler may include: a first circulation line through which operating fluid flows; and a second circulation line through which the lean absorbent liquid, the rich absorbent liquid, and/or the regeneration gas flow, wherein the first circulation line and the second circulation line are formed close to each other, and the operating fluid flowing through the first circulation line and the lean absorbent liquid, the rich absorbent liquid, and/or the regeneration gas flowing through the second circulation line are not mixed and exchange heat with each other.

A regeneration tower according to another exemplary embodiment of the present invention may include: a first housing in which a space is formed; a rich absorbent liquid supplier positioned at an upper portion of the first housing and supplying rich absorbent liquid into the first housing; a rectifier positioned below the rich absorbent liquid supplier in the first housing and rectifying flow of the rich absorbent liquid supplied downwardly in the first housing; a reboiler positioned below the rectifier in the first housing and configured to separate regeneration gas from the rich absorbent liquid by boiling the rich absorbent liquid; a second housing being a rich absorbent liquid tank; a separator configured to supply the rich absorbent liquid supplied from the rectifier to the rich absorbent liquid tank, bypassing the regeneration gas generated in the reboiler into the first housing through a path different from a supply path of the rich absorbent liquid to the reboiler, and disposed in the first housing between the reboiler and the rectifier; and a third housing being a lean absorbent liquid tank receiving lean absorbent liquid from which the regeneration gas is separated in the reboiler, wherein the reboiler receives the rich absorbent liquid only through the rich absorbent liquid tank.

A rich absorbent liquid outlet may be formed at a lower portion of the second housing and a rich absorbent liquid inlet that is in fluid communication with the rich absorbent liquid outlet may be formed at a lower portion of the first housing such that the rich absorbent liquid in the rich absorbent liquid tank is supplied to the reboiler through the rich absorbent liquid outlet and the rich absorbent liquid inlet.

The first housing may be in fluid communication with the second housing through a rich absorbent liquid connection line and may be in fluid communication with the third housing through a lean absorbent liquid connection line, and a connecting portion of the rich absorbent liquid connection line and the first housing may be positioned above a connecting portion of the lean absorbent liquid connection line and the first housing.

The separator may include: a mounting plate disposed traversely across the first housing below the connecting portion of the rich absorbent liquid connection line and the first housing and provided with at least one through-hole; a body of hollow pillar shape mounted on an upper surface of the mounting plate and having an upper surface blocked by a roof; and at least one regeneration gas bypass port formed at a side surface of the body and fluidly communicating an interior of the body with an exterior of the body, wherein the at least one through-hole is in fluid communication with an interior of the first housing below the mounting plate with the interior of the body.

The regeneration gas generated in the reboiler may be supplied into the first housing above the mounting plate only through the at least one through-hole and the at least one regeneration gas bypass port, and the rich absorbent liquid dropped from the rectifier may not be directly supplied to the reboiler by the mounting plate and be supplied to the rich absorbent liquid tank.

The connecting portion of the lean absorbent liquid connection line and the first housing may be positioned between the reboiler and the mounting plate.

The reboiler may include: a first circulation line through which operating fluid flows; and a second circulation line through which the lean absorbent liquid, the rich absorbent liquid, and/or the regeneration gas flow, wherein the first circulation line and the second circulation line are formed close to each other, and the operating fluid flowing through the first circulation line and the lean absorbent liquid, the rich absorbent liquid, and/or the regeneration gas flowing through the second circulation line are not mixed and exchange heat with each other.

The reboiler may be an electric wire that receives current and generates heat.

A regeneration gas outlet may be formed at the upper portion of the first housing, and the regeneration gas generated in the reboiler and supplied into the first housing through the separator may move upwardly in the first housing and be discharged through the regeneration gas outlet.

A regeneration tower according other exemplary embodiment of the present invention may include: a first housing in which a space is formed; a first rich absorbent liquid supplier positioned at an upper portion of the first housing and supplying rich absorbent liquid and/or condensed water into the first housing; a first rectifier positioned below the first rich absorbent liquid supplier in the first housing and rectifying flow of the rich absorbent liquid and/or condensed water supplied downwardly in the first housing; a second rich absorbent liquid supplier positioned below the first rectifier in the first housing and supplying the rich absorbent liquid into the first housing; a second rectifier positioned below the second rich absorbent liquid supplier in the first housing and rectifying the flow of the rich absorbent liquid supplied downwardly in the first housing; a reboiler positioned below the second rectifier in the first housing and configured to separate regeneration gas from the rich absorbent liquid by boiling the rich absorbent liquid; a second housing being a rich absorbent liquid tank; a separator configured to supply the rich absorbent liquid supplied from the second rectifier to the rich absorbent liquid tank, bypassing the regeneration gas generated in the reboiler into the first housing through a path different from a supply path of the rich absorbent liquid to the reboiler, and disposed in the first housing between the reboiler and the second rectifier; and a third housing being a lean absorbent liquid tank receiving lean absorbent liquid from which the regeneration gas is separated in the reboiler, wherein the reboiler receives the rich absorbent liquid only through the rich absorbent liquid tank.

A rich absorbent liquid outlet may be formed at a lower portion of the second housing and a rich absorbent liquid inlet that is in fluid communication with the rich absorbent liquid outlet may be formed at a lower portion of the first housing such that the rich absorbent liquid in the rich absorbent liquid tank is supplied to the reboiler through the rich absorbent liquid outlet and the rich absorbent liquid inlet.

The first housing may be in fluid communication with the second housing through a rich absorbent liquid connection line and may be in fluid communication with the third housing through a lean absorbent liquid connection line, and a connecting portion of the rich absorbent liquid connection line and the first housing may be positioned above a connecting portion of the lean absorbent liquid connection line and the first housing The separator may include: a mounting plate disposed traversely across the first housing below the connecting portion of the rich absorbent liquid connection line and the first housing and provided with at least one through-hole; a body of hollow pillar shape mounted on an upper surface of the mounting plate and having an upper surface blocked by a roof; and at least one regeneration gas bypass port formed at a side surface of the body and fluidly communicating an interior of the body with an exterior of the body, wherein the at least one through-hole is in fluid communication with an interior of the first housing below the mounting plate with the interior of the body.

The regeneration gas generated in the reboiler may be supplied into the first housing above the mounting plate only through the at least one through-hole and the at least one regeneration gas bypass port, and the rich absorbent liquid dropped from the rectifier may not be directly supplied to the reboiler by the mounting plate and be supplied to the rich absorbent liquid tank.

The connecting portion of the lean absorbent liquid connection line and the first housing may be positioned between the reboiler and the mounting plate.

The reboiler may include: a first circulation line through which operating fluid flows; and a second circulation line through which the lean absorbent liquid, the rich absorbent liquid, and/or the regeneration gas flow, wherein the first circulation line and the second circulation line are formed close to each other, and the operating fluid flowing through the first circulation line and the lean absorbent liquid, the rich absorbent liquid, and/or the regeneration gas flowing through the second circulation line are not mixed and exchange heat with each other.

The reboiler may be an electric wire that receives current and generates heat.

A regeneration gas outlet may be formed at the upper portion of the first housing, and the regeneration gas generated in the reboiler and supplied into the first housing through the separator may move upwardly in the first housing and be discharged through the regeneration gas outlet.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein the term "absorbent liquid" refers to absorbent liquid containing large amount of gas that is removing object or absorbent liquid after absorbing the gas and before regenerating the gas.

As used herein, the term "absorbent liquid" refers to absorbent liquid containing little amount of gas that is removing object or absorbent liquid from which gas is separated.

As used herein, the term "regeneration" refers to separation of gas from absorbent liquid.

As used herein, the term "regeneration gas" refers to gas separated from absorbent liquid.

It is to be understood that terms such as an "upper side", an "upper portion" or an "upper end" includes "one side", "one end portion", "one side portion" or "one end", and a "lower side", a "lower portion" or a "lower end" includes the "other side", the "other end portion", the "other side portion" or the "other end" unless indicated otherwise in context.

In addition, exemplary embodiments of the present invention can be applied to chemical absorption methods for separating gas by heating absorbent liquid after the gas is absorbed in the absorbent liquid as well as chemical absorption method for trapping carbon dioxide. Therefore, it is to be understood that the scope of the present invention is not limited to a reboiler and a regeneration tower used in chemical absorption methods for trapping the carbon dioxide.

Exemplary embodiments of the present invention will hereinafter be described in detail with reference to the accompanying drawings.

Figure 1:
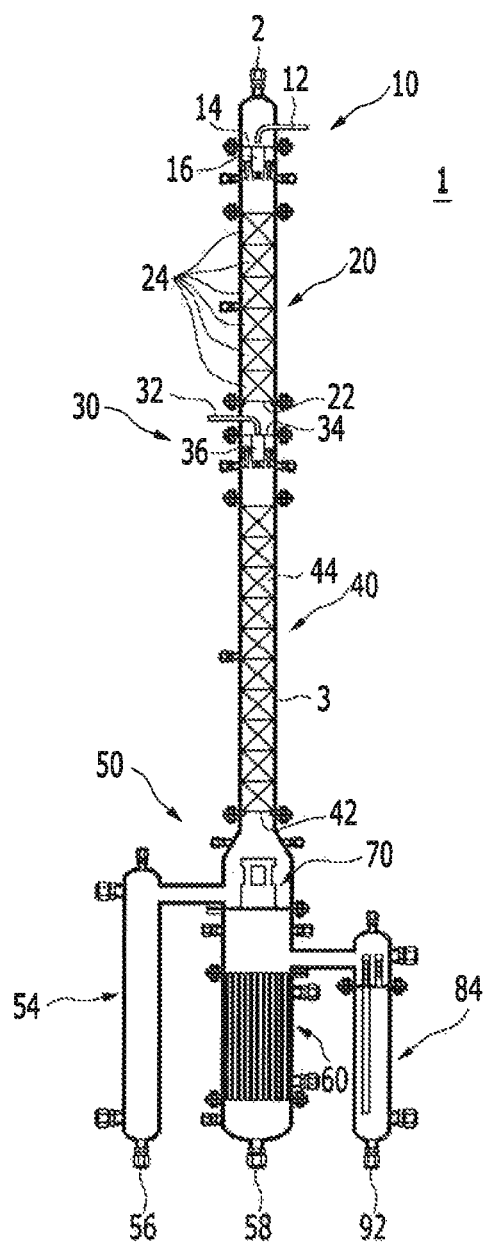
FIG. 1 is a schematic diagram of a regeneration tower according to an exemplary embodiment of the present invention.
Figure 2:
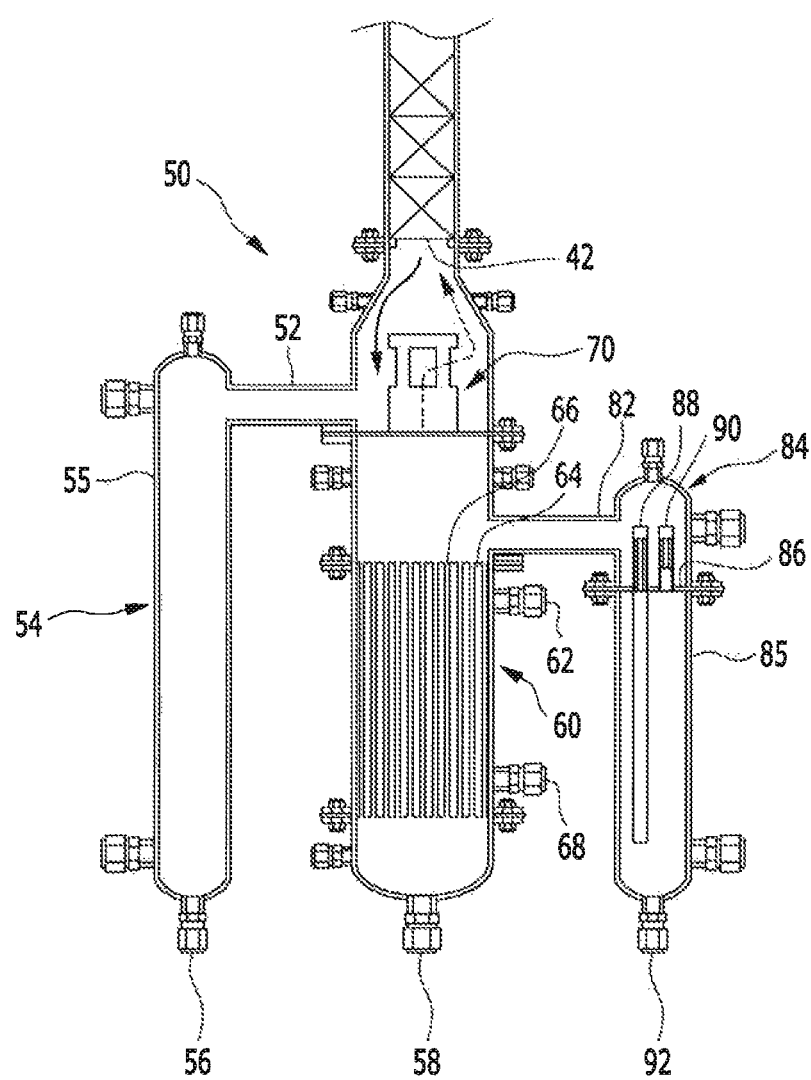
FIG. 2 is a schematic diagram of a reboiling device according to an exemplary embodiment of the present invention.
Figure 3:
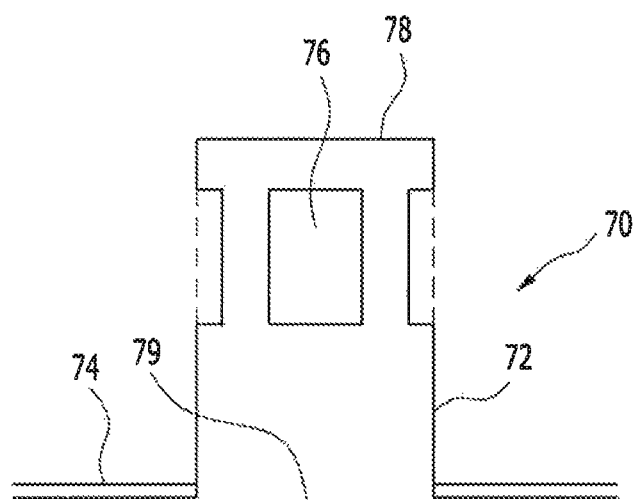
FIG. 3 is a schematic diagram of a separator according to an exemplary embodiment of the present invention.

FIG. 1 is a schematic diagram of a regeneration tower according to an exemplary embodiment of the present invention. FIG. 2 is a schematic diagram of a reboiling device according to an exemplary embodiment of the present invention. FIG. 3 is a schematic diagram of a separator according to an exemplary embodiment of the present invention.

As shown in FIG. 1, a regeneration tower 1 according to an exemplary embodiment of the present invention includes a first housing 3.

A space is formed in the first housing 3, and a first rich absorbent liquid supplying module 10, a first rectifying module 20, a second rich absorbent liquid supplying module 30, and a second rectifying module 40 are sequentially disposed in the space from an upper portion to a lower portion. In addition, a regeneration gas outlet 2 is formed at an upper end of the first housing 3 and a rich absorbent liquid inlet 58 is formed at a lower end of the first housing 3.

The first rich absorbent liquid supplying module 10 is disposed at the upper portion in the first housing 3 and includes a first rich absorbent liquid supply line 12, a plate 14, and a first rich absorbent liquid supplier 16.

The first rich absorbent liquid supply line 12 receives rich absorbent liquid from an absorption tower (not shown) or receives condensed water from a condenser (not shown) or a heat-exchanger (not shown). The first rich absorbent liquid supply line 12 supplies the rich absorbent liquid and/or the condensed water to the first rich absorbent liquid supplier 16.

The plate 14 is used to mount the first rich absorbent liquid supplier 16 at the first housing 3.

the first rich absorbent liquid supplier 16 supplies the rich absorbent liquid and/or the condensed water received from the first rich absorbent liquid supply line 12 into the first housing 3. The rich absorbent liquid and/or the condensed water supplied from the first rich absorbent liquid supplier 16 moves downwardly in the first housing 3 by gravity.

The first rectifying module 20 is disposed under the first rich absorbent liquid supplying module 10 in the first housing 3. The first rectifying module 20 includes a plate 22 and at least one first rectifier 24.

The plate 22 is used to mount the at least one first rectifier 24 at the first housing 3 and supports a bottom of the at least one first rectifier 24. At least one hole is formed on the plate 22 so as to flow the rich absorbent liquid and/or the condensed water passing through the first rectifier 24 downwardly in the first housing 3. On the contrary, the plate 22 is formed by removing a portion from a cross-section of the first housing 3.

The at least one first rectifier 24 is mounted on an upper surface of the plate 22. Each first rectifier 24 may be manufactured by twisting a thin and long wire in an irregular shape, but a method of manufacturing each first rectifier 24 is not limited to this. On the contrary, a foam plastic having large porosity may be used as the first rectifier 24. The first rectifier 24 rectifies the rich absorbent liquid and/or the condensed water so as to smoothen flow thereof.

The second rich absorbent liquid supplying module 30 is disposed below the first rectifying module 20 in the first housing 3 and includes a second rich absorbent liquid supply line 32, a plate 34, and a second rich absorbent liquid supplier 36.

The second rich absorbent liquid supply line 32 receives the rich absorbent liquid form the absorption tower and supplies the rich absorbent liquid to the second rich absorbent liquid supplier 36. The rich absorbent liquid supplied to the second rich absorbent liquid supply line 32 may be the same as or be different from that supplied to the first rich absorbent liquid supply line 12. That is, devices disposed between the regeneration tower and the first rich absorbent liquid supply line 12 may be the same as or different from those disposed between the regeneration tower and the second rich absorbent liquid supply line 32. If the devices disposed between the regeneration tower and the first rich absorbent liquid supply line 12 are different from those disposed between the regeneration tower and the second rich absorbent liquid supply line 32, temperature, pressure and gas concentration of the rich absorbent liquid supplied through the first rich absorbent liquid supply line 12 differ from those of the rich absorbent liquid supplied through the second rich absorbent liquid supply line 32.

The plate 34 is used to mount the second rich absorbent liquid supplier 36 at the first housing 3. At least one hole is formed on the plate 34 so as to flow the rich absorbent liquid and/or the condensed water passing through the first rectifier 24 downwardly in the first housing 3. On the contrary, the plate 34 is formed by removing a portion from a cross-section of the first housing 3.

The second rich absorbent liquid supplier 36 supplies the rich absorbent liquid received from the second rich absorbent liquid supply line 32 into the first housing 3. The rich absorbent liquid supplied from the second rich absorbent liquid supplier 36 moves downwardly in the first housing 3 by gravity.

The second rectifying module 40 is disposed below the second rich absorbent liquid supplying module 30 in the first housing 3. The second rectifying module 40 includes a plate 42 and at least one first rectifier 44.

The plate 42 is used to mount the at least one second rectifier 44 at the first housing 3 and supports a bottom of the at least one second rectifier 44. At least one hole is formed on the plate 42 so as to flow the rich absorbent liquid and/or the condensed water passing through the second rectifier 44 downwardly in the first housing 3. On the contrary, the plate 42 is formed by removing a portion from a cross-section of the first housing 3.

The at least one second rectifier 44 is mounted on an upper surface of the plate 42. Each second rectifier 44 may be manufactured by twisting a thin and long wire in an irregular shape, but a method of manufacturing each second rectifier 44 is not limited to this. On the contrary, a foam plastic having large porosity may be used as the second rectifier 44. The second rectifier 44 rectifies the rich absorbent liquid and/or the condensed water supplied from the first rich absorbent liquid supplier 16 so as to smoothen flow thereof, and rectifies the rich absorbent liquid supplied from the second rich absorbent liquid supplier 36 to smoothen flow thereof.

The regeneration tower I further includes a reboiling device 50. The reboiling device 50, as shown in FIG. 1, is disposed below the second rectifying module 40 and includes a rich absorbent liquid tank 54, a reboiler 60, a separator 70, and a lean absorbent liquid tank 84. The reboiling device 50 regenerates gas contained in the rich absorbent liquid supplied from the second rectifying module 40.

The rich absorbent liquid tank 54, as shown in FIG. 2, is formed at a second housing 55. The second housing 55 is in fluid communication with the first housing 3 through a rich absorbent liquid connection line 52 such that the rich absorbent liquid and/or the condensed water passing through the second rectifying module 40 is supplied to the rich absorbent liquid tank 54 through the rich absorbent liquid connection line 52. A rich absorbent liquid outlet 56 is formed at a lower portion of the rich absorbent liquid tank 54.

The reboiler 60 is mounted in the first housing 3 below the second rectifying module 40 and is disposed above a bottom of the first housing 3 by a predetermined distance. The reboiler 60 boils the rich absorbent liquid so as to separate regeneration gas from the rich absorbent liquid. The reboiler 60 includes a rich absorbent liquid inlet 58, an operating fluid inlet 62, a first circulation line 64, a second circulation line 66, and operating fluid outlet 68.

The rich absorbent liquid inlet 58 is formed at a lower portion of the first housing 3 and is in fluid communication with the rich absorbent liquid outlet 56 so as to receive the rich absorbent liquid from the rich absorbent liquid tank 54. Therefore, the rich absorbent liquid tank 54 supplies the rich absorbent liquid to the first housing 3. As the rich absorbent liquid is supplied to the first housing 3, a level of the rich absorbent liquid in the first housing 3 rises and the rich absorbent liquid is supplied to the reboiler 60.

The operating fluid inlet 62 is formed at a position corresponding to the reboiler 60 of the first housing 3 and is configured to supply operating fluid to the reboiler 60. The operating fluid may be water vapor generated in power plants or boiler equipments but may not be limited to this.

The first circulation line 64 is formed in the reboiler 60 and the operating fluid supplied through the operating fluid inlet 62 flows in the first circulation line 64. The first circulation line 64 is not in fluid communication with the interior of the first housing 3.

The second circulation line 66 is formed in the reboiler 60 and is formed close to the first circulation line 64. Typically, a portion of the reboiler 60 other than the first circulation line 64 becomes the second circulation line 66. The second circulation line 66 is in fluid communication with the interior of the first housing 3 such that the rich absorbent liquid exists in the second circulation line 66 if the level of the rich absorbent liquid supplied to the first housing 3 rises. At this time, the rich absorbent liquid in the second circulation line 66 exchanges heat with the operating fluid flowing through the first circulation line 64 and is heated. Therefore, the regeneration gas is separated from the rich absorbent liquid and the lean absorbent liquid is positioned at an upper portion of the reboiler 60. In addition, the regeneration gas separated from the rich absorbent liquid moves upwardly in the first housing 3.

The operating fluid outlet 68 is formed at a position corresponding to the reboiler 60 of the first housing 3 and the operating fluid circulating through the first circulation line 64 is discharged to the exterior of the first housing 3 through the operating fluid outlet 68.

Herein, it is exemplified but is not limited that the reboiler 60 is a heat-exchanger heating the rich absorbent liquid by heat-exchange with the operating fluid. The reboiler 60 may be an electric wire that receives current and generated heat.

The separator 70 is mounted in the first housing 3 between the second rectifying module 40 and the reboiler 60 and separates a supply path of the rich absorbent liquid to the reboiler 60 from a discharge path of the regeneration gas generated in the reboiler 60. For these purposes, the separator 70, as shown in FIG. 3, includes a mounting plate 74, a body 72, and a regeneration gas bypass port 76.

The mounting plate 74 is disposed traversely across the first housing 3 below a connecting portion of the rich absorbent liquid connection line 52 and the first housing 3. At least one through-hole 79 is formed at the mounting plate 74.

The body 72 is mounted on an upper surface of the mounting plate 74. An upper surface of the body 72 is blocked by a roof 78 such that the dropped rich absorbent liquid and/or condensed water do not enter an inside of the body 72 and pool on the mounting plate 74. The rich absorbent liquid pooled on the mounting plate 74 moves to the rich absorbent liquid tank 54 through the rich absorbent liquid connection line 52. In addition, the body 72 encloses the at least one through-hole 79 so as to prevent the rich absorbent liquid pooled on the mounting plate 74 from being directly supplied to the reboiler 60.

The at least one regeneration gas bypass port 76 is formed at a side surface of the body 72 and is in fluid communication with an interior of the body 72 with an exterior of the body 72. The at least one regeneration gas bypass port 76 is formed at a predetermined height from the mounting plate 74 such that the rich absorbent liquid pooled on the mounting plate 74 is prevented from entering the inside of the body 72 through the regeneration gas bypass port 76. That is, vertical position of the rich absorbent liquid connection line 52 is lower than that of the at least one regeneration gas bypass port 76.

The lean absorbent liquid tank 84, as shown in FIG. 2, is formed at a third housing 85. The third housing 85 is in fluid communication with the first housing 3 through the lean absorbent liquid connection line 82 such that the lean absorbent liquid from which the regeneration gas is separated in the reboiler 60 flows into the lean absorbent liquid tank 84 through the lean absorbent liquid connection line 82. A connecting portion of the lean absorbent liquid connection line 82 and the first housing 3 is positioned between the mounting plate 74 and the reboiler 60. Therefore, the rich absorbent liquid undergoing the regeneration in the reboiler 60 is not supplied to the separator 70 and is supplied to the lean absorbent liquid tank 84.

A lean absorbent liquid outlet 92 is formed at a lower end of the lean absorbent liquid tank 84 so as to discharge the lean absorbent liquid in the lean absorbent liquid tank 84. In addition, a supporting plate 86 is mounted in the lean absorbent liquid tank 84 and a level sensor 88 and a pressure sensor 90 may be mounted on the supporting plate 86. The level sensor 88 detects a level of the lean absorbent liquid in the lean absorbent liquid tank 84 and the pressure sensor 90 detects pressure of the lean absorbent liquid tank 84. In addition, the lean absorbent liquid outlet 92 can be closed or open based on detecting results by the level sensor 88 and the pressure sensor 90.

Hereinafter, operation of the regeneration tower I according to an exemplary embodiment of the present invention will be described in detail.

As shown in FIG. 1, if the rich absorbent liquid is supplied from the absorption tower into the first housing 3 through the first rich absorbent liquid supplying module 10 or the second rich absorbent liquid supplying module 30, the rich absorbent liquid moves downwardly by gravity. At this time, the flow of the rich absorbent liquid is rectified by the first rectifying module 20 or the second rectifying module 40.

The rich absorbent liquid, as represented by a solid line arrow in FIG. 2, cannot move to the interior of the body 72 by the roof 78, moves onto the mounting plate 74, and pools on the mounting plate 74. If a level of the rich absorbent liquid pooled on the mounting plate 74 becomes higher than a height of a lower end of the rich absorbent liquid connection line 52, the rich absorbent liquid is supplied into the rich absorbent liquid tank 54 through the rich absorbent liquid connection line 52 and is then supplied into the first housing 3 through the rich absorbent liquid outlet 56 and the rich absorbent liquid inlet 58.

If the level of the rich absorbent liquid in the first housing 3 becomes higher and the rich absorbent liquid is supplied to the reboiler 60, the rich absorbent liquid is heated and the regeneration gas is separated from the rich absorbent liquid through heat-exchange between the rich absorbent liquid and the operating fluid. The regeneration gas separated from the rich absorbent liquid, as represented by a dotted line arrow in FIG. 2, moves to the exterior of the body 72 through the through-hole 79 and the regeneration gas bypass port 76. The regeneration gas moves upwardly and is discharged from the first housing 3 through the regeneration gas outlet 2. The regeneration gas outlet 2 may be connected to a regeneration gas tank (not shown) through an additional line and may be stored in the regeneration gas tank.

Meanwhile, as the rich absorbent liquid is supplied to the reboiler 60 continuously, the level of the lean absorbent liquid from which the regeneration gas is separated becomes higher. If the level of the lean absorbent liquid becomes higher than a height of the lower end of the lean absorbent liquid connection line 82, the lean absorbent liquid is supplied to the lean absorbent liquid tank 84 through the lean absorbent liquid connection line 82. The lean absorbent liquid supplied to the lean absorbent liquid tank 84 is discharged from the third housing 85 through the lean absorbent liquid outlet 92.

As described above, a supply path of the mixed liquid into the reboiler is separated from a discharge path of the gas from the reboiler according to the exemplary embodiment of the present invention. Therefore, the gas is separated from the absorbent liquid stably. In addition, gas separation process may be performed stably and gas separation efficiency may be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A reboiling device, comprising:
   a reboiler provided in a lower portion of a first housing and configured to separate regeneration gas from rich absorbent liquid by boiling the rich absorbent liquid;
   a rich absorbent liquid tank provided in a second housing and configured to supply the rich absorbent liquid to the reboiler;
   a lean absorbent liquid tank provided in a third housing and configured to receive lean absorbent liquid from which the regeneration gas is separated directly from the reboiler and discharge the lean absorbent liquid; and
   a separator disposed above the reboiler in the first housing and configured to discharge the separated regeneration gas from the reboiler, to guide the rich absorbent liquid above the separator in the first housing to the rich absorbent liquid tank, and to prevent the rich absorbent liquid above the separator in the first housing from being directly supplied to the reboiler.

2. The reboiling device of claim 1, wherein the first housing and the second housing are in fluid communication with each other through a rich absorbent liquid connection line above the reboiler, and the first housing and the third housing are in fluid communication with each other through a lean absorbent liquid connection line between the reboiler and the separator.

3. The reboiling device of claim 2, wherein the rich absorbent liquid is supplied from an upper portion of the reboiling device in the first housing to the rich absorbent liquid tank through the rich absorbent liquid connection line, and a lower portion of the rich absorbent liquid tank and a lower portion of the reboiler are in fluid communication with each other such that the rich absorbent liquid in the rich absorbent liquid tank is supplied to the lower portion of the reboiler.

4. The reboiling device of claim 1, wherein the separator comprises:
   a mounting plate disposed traversely across the first housing so as to divide the first housing into two regions, disposed above the reboiler, and provided with at least one through-hole formed at a middle portion thereof and in fluid communication with the two regions;
   a body of hollow pillar shape mounted on an upper surface of the mounting plate and having a lower surface in fluid communication through the at least one through-hole with one region of the first housing in which the reboiler is disposed, and an upper surface blocked by a roof; and
   at least one regeneration gas bypass port formed at a side surface of the body and fluidly communicating an interior of the body with an exterior of the body,
   wherein the at least one through-hole is formed at a side surface of the body.

5. The reboiling device of claim 4, wherein the first housing and the second housing are in fluid communication with each other through the rich absorbent liquid connection line, the first housing and the third housing are in fluid communication with each other through the lean absorbent liquid connection line, a connecting portion of the rich absorbent liquid connection line and the first housing is positioned above the mounting plate, and a connecting portion of the lean absorbent liquid connection line and the first housing is positioned below the mounting plate.

6. The reboiling device of claim 5, wherein a connecting portion of the lean absorbent liquid connection line and the first housing is positioned above the reboiler.

7. The reboiling device of claim 1, wherein the reboiler comprises:
   a first circulation line through which operating fluid flows; and
   a second circulation line through which at least one of the lean absorbent liquid, the rich absorbent liquid, and the regeneration gas flow,
   wherein the first circulation line and the second circulation line are formed close to each other, and the operating fluid flowing through the first circulation line and the at least one of the lean absorbent liquid, the rich absorbent liquid, and the regeneration gas flowing through the second circulation line are not mixed and exchange heat with each other.

* * * * *